United States Patent [19]
O'Rourke et al.

[11] Patent Number: 5,960,742
[45] Date of Patent: Oct. 5, 1999

[54] PORTABLE CANINE WATER DISPENSER AND DRINKING DEVICE

[76] Inventors: Anthony O'Rourke, 23852 Pacific Coast Hwy., #201, Malibu, Calif. 90265; Elwin Arthur Russell, 3852 Bledsoe Ave., Los Angeles, Calif. 90066

[21] Appl. No.: 09/054,236

[22] Filed: Apr. 2, 1998

[51] Int. Cl.[6] .................................................. A01K 7/00
[52] U.S. Cl. ............................. 119/74; 119/77; 141/356; 222/490; 222/494
[58] Field of Search ................................ 119/77, 72, 74, 119/72.5, 81, 464, 475, 477, 51.5; 141/351, 356; 222/490, 494

[56] References Cited

U.S. PATENT DOCUMENTS

| | | | |
|---|---|---|---|
| 3,532,076 | 10/1970 | Parker et al. | 119/81 |
| 5,636,592 | 6/1997 | Wechsler | 119/52.1 |
| 5,809,935 | 9/1998 | Kolterman et al. | 119/74 |

FOREIGN PATENT DOCUMENTS

| | | | |
|---|---|---|---|
| 2059895 | 7/1993 | Canada | 119/72 |

*Primary Examiner*—Michael J. Carone
*Assistant Examiner*—James S. Bergin
*Attorney, Agent, or Firm*—Lyon & Lyon LLP

[57] ABSTRACT

A water and drinking device for pets which includes a water container, a flexible valve assembly removably secured to the outlet end of the container and a lapping pan. The water container is pivotally secured to the lapping pan by the valve assembly thereon such that the water container can be moved from a folded storage position wherein the container is partially encased within the pan to a serving position wherein the container is disposed in an inverted inclination above the pan. The valve assembly comprises a flexible valve member, an actuating arm projecting from the valve member and a water outlet slit disposed in a concave end wall of the valve member which is aligned perpendicularly with respect to the actuating arm. When the water container is moved to the serving position, the actuating arm on the valve member abuts the stop member in the lapping pan and flexes the valve member so as to slightly open the water outlet slit so as to allow air flow therethrough and provide pressure equalization within the container. The slit is sized so as to cooperate with the atmospheric pressure and surface tension of the water within the container interiorly of the slit so as to prevent water flow therethrough when the valve member is both in a flexed and unflexed disposition. Upon squeezing the container, water is forced from the container through the slit and into the lapping pan for consumption by the pet. Cessation of the squeezing action, however, causes a cessation of the water flow thereby providing a precise metering of the flow into the lapping pan and preventing leakage.

15 Claims, 2 Drawing Sheets

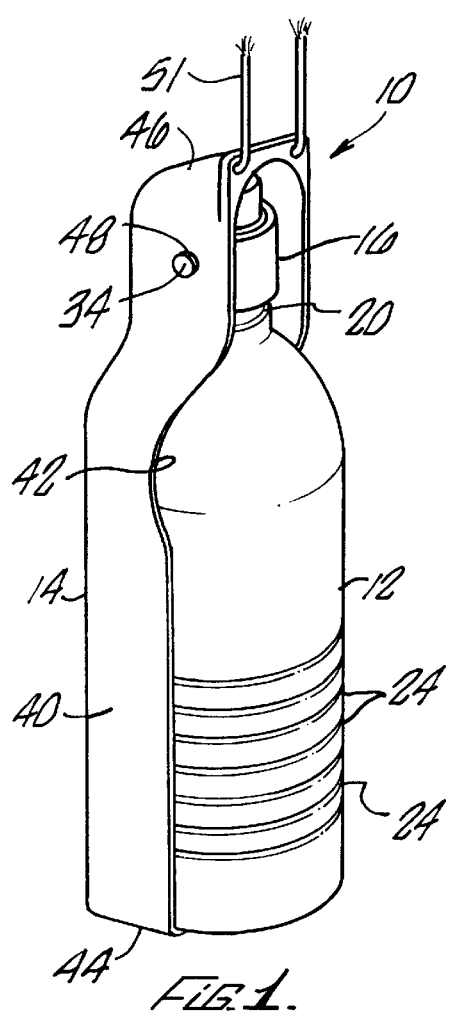
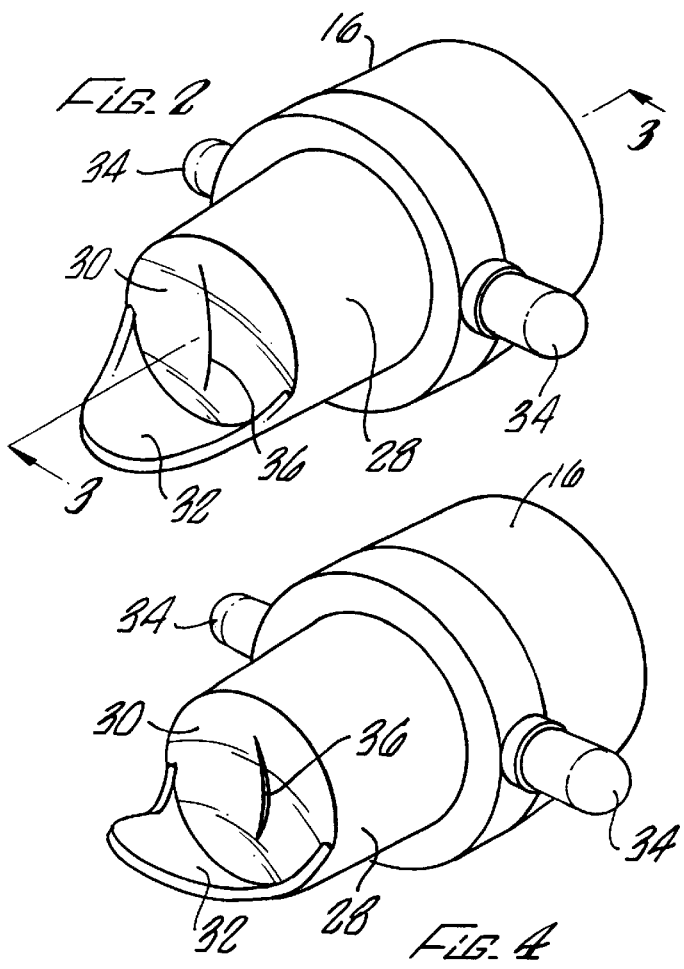
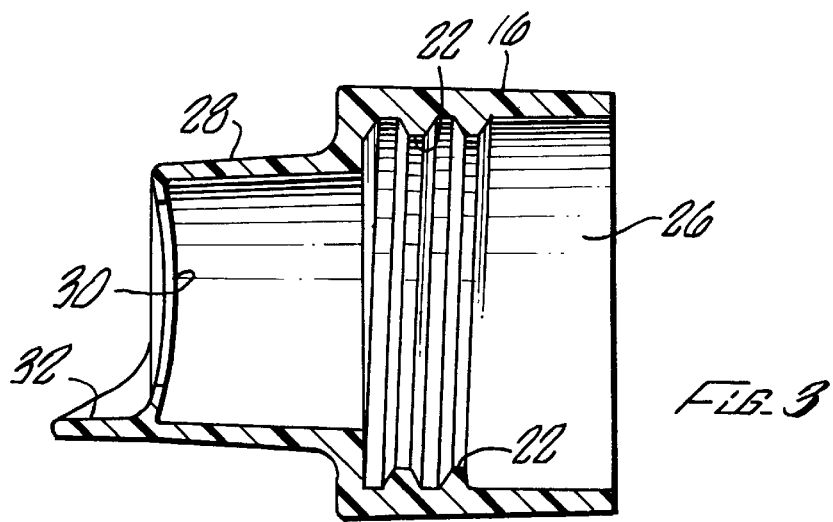

PORTABLE CANINE WATER DISPENSER AND DRINKING DEVICE

BACKGROUND OF THE INVENTION

The present invention relates to a portable drinking device for pets and particularly for dogs. Approximately forty percent of the households in the United States and Europe have dogs as pets. The provision of food and water and care for dogs and other pet animals is today often approached with virtually the same diligence as applied to human family members. Because of the strong emotional bond between dogs and their owners, dogs are frequently taken on both recreational and exercise excursions. In addition to the companionship they provide, dogs are also taken on these excursions for protection. While on these excursions, food and water for dogs is very important. There are many dry dog foods and treats which are readily portable and easily dispensable without undue mess and clean up. Water, however, is frequently a problem. A bottle of water and some form of bowl or cup provides the dog with a portable water supply and drinking apparatus but is often an inconvenient method of providing a dog with a drink of water, particularly if on foot. Such a method is also not well suited for traveling in an automobile due to the spillage which is likely to result. It would therefore be highly desirable to provide a fully portable water supply with an integrated dispenser and server combined in one easy-to-use device. The present invention provides such a device.

SUMMARY OF THE PRESENT INVENTION

Briefly, the dispensing and drinking device of the present invention includes a water container provided with a removable flex valve at the filling and discharge end of the container. The container is hingedly mounted proximate its filling and discharge end within a lapping pan so as to be movable with respect to the pan between a folded storage position and a serving position. In the folded storage position, the water container nests within the pan such that the pan forms a protective shell about a portion of the container and the flex valve. In the serving position, the container is pivoted to an inclined inverted position above the pan such that any discharge of water through the flex valve on the container flows into the lapping pan.

The removable flex valve includes a flexible end portion having a vertically disposed elongated water outlet slit in an extended concave end wall thereof and an activating arm projecting outwardly from the end wall perpendicular to the outlet slit. Upon the water container being pivoted to the serving position, the actuator arm on the flex valve abuts a stationary stop formed in the lower portion of the lapping pan. When holding the dispensing and drinking device by the water container in the serving position, the weight of the pan causes the projecting actuating arm on the flex valve to bear against the stop in the lapping pan, causing the end wall to flex and the outlet slit to open slightly so as to allow the ingress of air into the water container to equalize the pressure therein. The slit is sized such that even in the flexed position, the combination of atmospheric pressure and surface tension of the water will prevent water from passing therethrough into the pan, thereby providing a leak-proof device in the folded storage position and a controllable valve in the storage position.

Water is discharged into the pan through the slit in the flex valve by the pet owner's squeezing of the water container while in the serving position with the outlet slit being held slightly open by the flexing of the end wall of the flex valve. Cessation of the squeezing of the water container stops the flow of water from the container to the lapping pan thereby providing a readily controllable and meterable water flow from the container to the pan. As the water container is conveniently held in one hand by the pet owner, the water containing lapping pan can be readily presented to the dog in a convenient disposition for drinking while minimizing any spillage. When the dog has finished drinking, the water container can be easily folded back into its storage and carrying position within the lapping pan where the container is protected and the flex valve shielded from contamination.

It is the principal object of the present invention to provide a portable water dispenser and drinking device for pets which is convenient to transport and store and is easy to use.

It is another object of the present invention to provide a portable water dispenser and drinking device for pets which is resistant to leakage.

It is yet another object of the present invention to provide a portable water dispenser and drinking device for pets which is resistant to damage and highly sanitary.

It is yet another object of the present to provide a portable water dispenser and drinking device for pets which is of simple construction and easy to manufacture.

These and other objects and advantages of the present invention will become readily apparent from the following detailed description taken in conjunction with the accompanying drawings.

DESCRIPTION OF THE PREFERRED EMBODIMENT

IN THE DRAWINGS

FIG. 1 is a perspective view of the water dispenser and drinking device of the present invention shown in the folded storage position.

FIG. 2 is a perspective view of the flex valve assembly employed in the portable water dispenser and drinking device of the present invention.

FIG. 3 is a sectional view taken along the line 3—3 in FIG. 2.

FIG. 4 is a perspective view of the flex valve assembly employed in the present invention and illustrating the end wall of the valve assembly in the flexed position.

Figure 5:
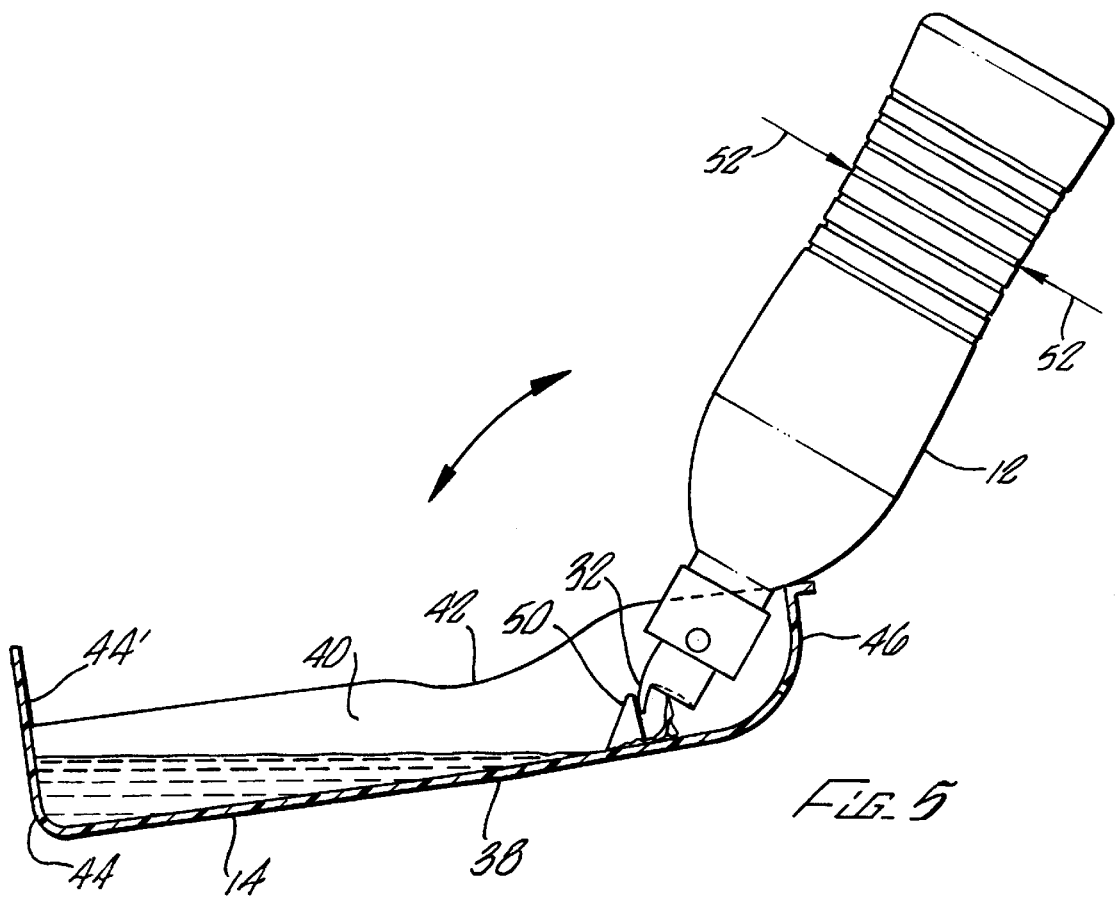
FIG. 5 is a partial sectional side view of the portable water dispenser and drinking device of the present invention shown in the serving position.

Referring now in detail to the drawings, the water dispenser and drinking device 10 of the present invention comprises a water container 12, a lapping pan 14 and a flex valve assembly 16. The water container 12 is a conventional one-half liter size P.E.T.E. plastic water bottle of the type marketed under the names Sparkletts, Arrowhead and Evian for their supermarket mass market water products. The container is formed of a flexible plastic material and defines a water filling and discharge end 20 which is provided with exterior threads (not shown) adapted to mate with internal threads 22 formed on the flexible valve assembly 16 to provide a removable attachment of the flexible valve assembly 16 for the filling and emptying of the container 12. The container 12 is also preferably provided with a plurality of annular ribs 24 in the lower portion thereof to prevent permanent deformation upon being squeezed.

The flexible valve assembly 16 is preferably of single-piece construction and injection molded of a flexible thermoplastic material to define a cylindrical bore portion 26 in which internal threads 22 are formed for the removable securement of the valve assembly 16 to the water container 12. An extended cylindrical nozzle portion 28 projects from and is in fluid communication with bore portion 26 and terminates in a flexible concave end wall 30. A valve actuator arm 32 is formed along a perimeter portion of end wall 30 and projects outwardly therefrom. A pair of laterally projecting opposed hinge pins 34 are disposed on the valve assembly at the forward end of bore portion 26 and project radially therefrom to provide a pivotal securement of the water container 12 to and within the lapping pan 14 as will be described. The wall thickness of the cylindrical nozzle portion 28 of the valve assembly is preferably about 0.030–0.08 inches and the thickness of the end wall 30 is within the range of about 0.020–0.060 inches. End wall 30 is preferably of a concave configuration defining a radius of curvature within the range of about 0.75–1.5 inches. A water outlet slit 36 is provided in end wall 30. Outlet slit 36 is about 0.250–0.625 inches in length, and more preferably about 0.50 in., and is vertically disposed within end wall 30 such that slit 36 extends perpendicularly to the bottom surface of the forwardly projecting actuator arm 32.

Figure 6:
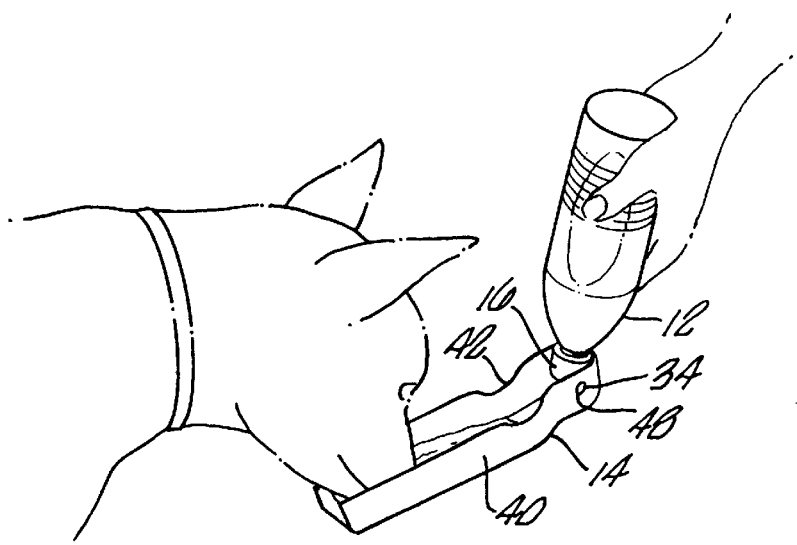
FIG. 6 is a perspective view showing the portable water dispenser and drinking device of the present invention in use.

The lapping pan 14 is of a tray configuration having a bottom wall 38 and side walls 40 which project upwardly about bottom wall 38 and are contoured to fit snugly about a portion of the water container 12 in the folded storage position as illustrated in FIG. 1. The side walls 40 preferably define opposed recessed areas 42 to allow the user to better grasp the water container 12 to move the water container to the serving position illustrated in FIGS. 5 and 6. The end wall 44 of the lapping pan defines a raised portion 44' so as to provide a planar platform on which the water dispenser and drinking device 10 can be stored in an upright disposition, as seen in FIG. 1. The forward wall 46 of the lapping pan, which is an extension of the side walls, extends about and defines a valve cover in the folded storage position to shield the flex valve assembly 16 from contaminants. Opposed apertures 48 are formed in side walls 40 proximate forward wall 46 to receive the hinge pins 34 on the flexible valve assembly 16 and provide a pivotal securement of the water container 12 to the lapping pan 14 such that the water container can be moved between the folded storage position illustrated in FIG. 1 and the serving position illustrated in FIG. 5. The lapping pan 14 further defines an upstanding stop member 50 disposed on the interior floor of the pan, as seen in FIG. 5. Stop member 50 is positioned in the pan such that upon pivoting the water container 12 to the serving position, the actuator arm 32 on the flexible valve assembly 16 abuts the stop member 50 in the lapping pan.

In use, the water dispenser and drinking device 10 is readily stored and transported in the folded storage position illustrated in FIG. 1. A carrying cord 51 is preferably provided to facilitate carrying the device 10 in an upright disposition on excursions as is also illustrated in FIG. 1. As a result of the configuration of the outlet slit 36 and the concavity of the end wall 30 in the flexible valve assembly in combination with the atmospheric pressure and surface tension of the water interiorly of end wall 30, the water container 12 is virtually leak-proof, even in an inverted position. Upon raising the water container 12 to the serving position, the weight of the lapping pan causes the actuating arm 32 on the flexible valve assembly 16 to bear against the stop 50 in the lapping pan, which causes the concave end wall 30 of the valve assembly to flex inwardly, slightly opening the vertically disposed water outlet slit 50 therein. This slight opening of slit 36 (see FIG. 4) allows the ingress of air into the water container to prevent a vacuum buildup within the container. The slit opening is not, however, sufficiently large to allow water to pass therethrough due to atmospheric pressure and the surface tension of the water interiorly of the slit 36. To initiate water flow into the lapping pan 14, it is only necessary to squeeze the water container as illustrated by the arrows identified by reference numerals 52 in FIG. 5. The amount of water released into the lapping pan is controlled entirely by the squeezing action on the flexible water container 12. When the squeezing of the container ceases, the water flow through the flexible valve assembly also ceases.

Thus, through the aforesaid cooperation of the flexible valve assembly 16, water container 12 and lapping pan 14, not only is a leak-proof and a readily portable and easily usable dispensing and drinking device provided, the lapping pan also serves to enclose and protect the water container from accidental damage when being stored, pocketed or transported in the folded position and protects the flexible valve assembly from accidental contact and possible resulting water leakage. The pan also helps to keep the flexible valve assembly in a sanitary condition. In the serving position, the assembly allows the pet owner to hold the device in one hand with the arm fully extended in a downward inclination toward the pet. This provides a very convenient and comfortable position for the pet owner as it requires no stooping, bending or manipulation of the device. The "hand-feeding" aspect of using the dispensing and drinking device 10 of the present invention also provides an affectionate interaction for the pet and pet owner.

Various changes and modifications could be made in carrying out the present invention without departing from the spirit and scope thereof. By way of example only, the flexible valve assembly could be of two-piece construction (not shown) wherein the opposed hinge pins 34 are formed on and carried by a valve retainer ring constructed of a relatively rigid plastic and defining an open forward end and interior threads for threadably engaging the neck of the water container. The flexible valve element would be constructed of the flexible material of flex valve assembly 16 and would have the configuration of the nozzle portion 28 of valve assembly 16 but with a radial flange at the base thereof. The valve element would project through the opening in the ring such that upon the ring being threadably engaged with the water container, the flexible valve member would be held against the water outlet end of the container by the retaining ring. In addition, different water container configurations could be employed as well as possible variations in the configuration of the slit opening in the end wall 30 of the flexible valve assembly. Insofar as these and other changes are within the purview of the appended claims, they are to be considered as part of the present invention.

We claim:

1. A water dispenser and drinking device for pets comprising a container adapted to hold a supply of water therein, a valve assembly removably secured to said container for allowing the selective passage of water therethrough, and a lapping pan, said valve assembly defining pivot members thereon, said members cooperating with said lapping pan to provide a pivotal movement of said container from a folded storage position wherein said container is partially encased within said pan and a serving position wherein said container is disposed in an inverted inclination above said pan, and wherein said valve assembly comprises a flexible valve member, an actuating arm projecting from said member and a water outlet slit disposed in said member in a substantially perpendicular disposition with respect to said actuating arm and wherein said lapping pan provides a stop member therein adapted to abut said actuating arm and open said slit upon said water container being moved to the aforesaid serving position whereby air flow through said slit provides pressure equalization within said container and whereby upon squeezing said container while in said serving position, water flow is forced from said container through said slit into said lapping pan, said slit being sized such that the cessation of said squeezing causes a cessation of said water flow.

2. The water dispenser and drinking device of claim 1 wherein said flexible valve member defines a concave surface adjacent said actuating arm and said water outlet slit is disposed in said surface whereby any water pressure within said container acting on said surface when said container is in said storage position biases said slit to a closed disposition and reduces water leakage therethrough.

3. A water dispenser and drinking device for pets comprising a flexible container adapted to hold a supply of water therein, a valve assembly carried by said container for allowing the selective passage of water therethrough, and a lapping pan, said valve assembly cooperating with said lapping pan to define a pivot mounting therebetween whereby said container can be pivotally moved with respect to said lapping pan between a folded storage position and an extended serving position, said container being partially disposed within said lapping pan in said storage position and disposed above said lapping pan in an inverted inclination in said serving position, said valve assembly including a flexible valve member having a water outlet slit disposed therein, said slit being closed when said container is in said storage position and said valve member being deformed and opening said slit to allow water to flow therethrough into said pan upon said container being moved to said serving position and squeezed while in said serving position.

4. The water dispenser and drinking device of claim 3 wherein said valve member defines a concave surface and said water outlet slit is disposed in said surface whereby any water pressure within said container acting on said surface when said container is in said storage position biases said slit to a closed disposition and reduces water leakage therethrough.

5. A water dispenser and drinking device for pets comprising a flexible container adapted to hold a supply of water therein, a valve assembly carried by said container for allowing the selective passage of water therethrough, and a lapping pan, said valve assembly cooperating with said lapping pan to define a pivot mounting therebetween whereby said container can be pivotally moved with respect to said lapping pan between a folded storage position and an extended serving position, said container being partially disposed within said lapping pan in said storage position and disposed above said lapping pan in an inverted inclination in said serving position, said valve assembly including a flexible valve member having a water outlet slit disposed therein, said valve member deforming and opening said slit to allow air to pass therethrough upon said container being pivotally moved from said storage position to said serving position, said valve member further deforming and further opening said slit to allow the passage of water therethrough into said lapping pan upon said container being squeezed while in said serving position, and upon the cessation of said squeezing, said slit narrows to prevent the passage of water therethrough.

6. A water dispenser and drinking device for pets comprising a container adapted to hold a supply of water therein, a valve assembly carried by said container for allowing the selective passage of water therethrough, and a lapping pan, said valve assembly cooperating with said lapping pan to define a pivot mounting therebetween whereby said container can be pivotally moved with respect to said lapping pan between a folded storage position and an extended serving position, said container being partially encased within said lapping pan in said storage position and disposed above said lapping pan in an inverted inclination in said serving position, said valve assembly being closed in said storage position and opening in response to said container being pivotally moved from said storage position to said serving position so as to allow air flow therethrough while preventing water flow therethrough and opening further in response to the squeezing of said container in said serving position so as to allow water flow therethrough and into said lapping pan.

7. The water dispenser and drinking device of claim 6 wherein said valve assembly includes a flexible valve member having a water outlet slit disposed therein, said valve member being deformed so as to open said slit therein to allow said air flow therethrough and wherein said slit is opened further upon said container being squeezed while in said serving position to allow said water flow therethrough.

8. A water dispenser and drinking device for pets comprising a flexible container adapted to hold a supply of water therein, a valve assembly carried by said container for allowing the selective passage of water therethrough, and a lapping pan, said valve assembly defining pivot members thereon, said members cooperating with said lapping pan to provide a pivotal movement of said container with respect to said lapping pan between a folded storage position and an extended serving position, said container being partially encased within said lapping pan in said storage position and disposed above said lapping pan in an inverted inclination in said serving position and wherein said valve assembly is closed in said storage position and upon said container being pivotally moved to said serving position, said valve assembly engages a portion of said lapping pan and opens to a first position allowing air flow therethrough while preventing water flow therethrough and upon said container being squeezed while in said serving position, said valve assembly opens to a second position allowing water flow therethrough into said lapping pan, and upon the cessation of said squeezing of said container, said valve assembly returns to said first position thereby causing a cessation of said water flow into said lapping pan while allowing air to pass therethrough so as to equalize air pressure across said valve assembly.

9. The water dispenser and drinking device of claim 8 wherein said valve assembly includes a flexible valve member having a water outlet slit disposed therein, said member being deformed by said portion of said pan in said first position sufficiently to partially open said slit and being further deformed upon the squeezing of said container in said serving position to further open said slit to said second position.

10. The water dispenser and drinking device of claim 9 wherein said valve assembly includes an actuating arm, said arm being substantially perpendicular to said water outlet slit and wherein said portion of said lapping pan defines an upstanding stop member for engaging said actuating arm and deforming said valve member upon said container being moved to said serving position.

11. A water dispenser and drinking device for pets comprising a flexible container adapted to hold a supply of water therein, a valve assembly carried by said container for allowing the selective passage of water therethrough, and a lapping pan having upstanding wall portions, said valve assembly cooperating with said lapping pan to define a pivot mounting therebetween whereby said container can be pivotally moved between a folded storage position and an extended serving position, said wall portions of said lapping pan extending adjacent to and partially encasing said container in said storage position, said container being disposed above said lapping pan in an inverted inclination in said serving position and wherein said valve assembly includes a flexible valve member having a water outlet slit disposed therein, said slit being closed in said storage position and, upon said container being pivoted to said serving position and squeezed while in said serving position, said member is deformed to open said slit to allow water flow therethrough and into said lapping pan and upon the cessation of said squeezing, said slit closes sufficiently to cause a cessation of water flow therethrough while allowing air to pass therethrough to prevent a pressure drop within said container.

12. The water dispensing and drinking device of claim 11 wherein said flexible valve member is of a concave configuration.

13. The water dispensing and drinking device of claim 11 wherein said valve assembly includes an actuating arm projecting therefrom, said arm being adapted to abut a portion of said lapping pan and deform said valve member upon said container being pivotally moved to said serving position thereby opening said slit and allowing air to pass therethrough to equalize the air pressure across said slit, and wherein said valve member further deforms thereby further opening said slit and allowing water to pass therethrough upon said container being squeezed while in said serving position.

14. A water dispenser and drinking device for pets comprising a flexible container adapted to hold a supply of water therein, a valve assembly carried by said container for allowing the selective passage of water therethrough, and a lapping pan, said lapping pan being operatively secured to said container such that said container can be moved with respect to said lapping pan between a folded storage position and an extended serving position, said container being partially disposed within said lapping pan in said storage position and disposed above said lapping pan in an inverted inclination in said serving position, said valve assembly including a deformable valve member having a water outlet slit therein, said valve member maintaining said slit in a closed disposition when said container is in said storage position, deforming to open said slit sufficiently to allow air flow therethrough upon said container being moved to said serving position and further deforming to further open said slit to allow water to flow therethrough into said pan upon said container being squeezed while in said serving position, said valve member closing sufficiently to prevent the passage of water therethrough upon the cessation of said squeezing.

15. A water dispenser and drinking device for pets comprising a flexible container adapted to hold a supply of water therein, a valve assembly carried by said container for allowing the selective passage of water therethrough, a lapping pan and a valve actuating arm carried by said lapping pan, said lapping pan being operatively secured to said container such that said container can be moved with respect to said lapping pan between a folded storage position and an extended serving position, said container being partially disposed within said lapping pan in said storage position and disposed above said lapping pan in an inverted inclination in said serving position, said valve assembly including a deformable valve member having a water outlet slit therein, said valve member maintaining said slit in a closed disposition when said container is in said storage position and, upon said container being moved to said serving position, said valve member engages said actuating arm on said lapping pan, deforming said valve member and opening said slit to a first position allowing air flow therethrough, and upon said container being squeezed while in said serving position, said valve member further deforms and opens said slit to a second position allowing water flow therethrough into said lapping pan and, upon the cessation of said squeezing, said slit closes to said first position and prevents water flow therethrough.

* * * * *